United States Patent
Waldhauser

(10) Patent No.: US 12,367,158 B2
(45) Date of Patent: Jul. 22, 2025

(54) METHOD FOR OPERATING A MULTIPLICITY OF PERIPHERALS OF A VEHICLE, COMPUTER-READABLE MEDIUM, SYSTEM, AND VEHICLE

(71) Applicant: Bayerische Motoren Werke Aktiengesellschaft, Munich (DE)

(72) Inventor: Dirk Waldhauser, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 18/263,524

(22) PCT Filed: Sep. 28, 2021

(86) PCT No.: PCT/EP2021/076695
§ 371 (c)(1),
(2) Date: Jul. 28, 2023

(87) PCT Pub. No.: WO2022/174941
PCT Pub. Date: Aug. 25, 2022

(65) Prior Publication Data
US 2024/0104028 A1    Mar. 28, 2024

(30) Foreign Application Priority Data
Feb. 16, 2021   (DE) ..................... 10 2021 103 569.4

(51) Int. Cl.
*G06F 13/10* (2006.01)
(52) U.S. Cl.
CPC .......... *G06F 13/10* (2013.01); *G06F 2213/40* (2013.01)
(58) Field of Classification Search
CPC .............................. G06F 13/10; G06F 2213/40
See application file for complete search history.

(56) References Cited

U.S. PATENT DOCUMENTS

| | | | |
|---|---|---|---|
| 2005/0230977 A1 | 10/2005 | Prema et al. | |
| 2012/0109407 A1* | 5/2012 | Yousefi | H04W 72/541 701/1 |
| 2020/0114768 A1 | 4/2020 | Oestreich et al. | |

FOREIGN PATENT DOCUMENTS

| | | |
|---|---|---|
| DE | 19709317 A1 | 9/1998 |
| DE | 102010003684 A1 | 11/2010 |

(Continued)

OTHER PUBLICATIONS

International Search Report corresponding to International Patent Application No. PCT/EP2021/076695, dated Jan. 28, 2022 (6 pages).

(Continued)

*Primary Examiner* — Zachary K Huson
(74) *Attorney, Agent, or Firm* — Maginot, Moore & Beck LLP

(57) ABSTRACT

A method for operating integrated circuits of peripherals of a vehicle includes receiving a set of resource requests from one or more applications of the vehicle, wherein a resource request of the set of resource requests at least one resource from one or more peripherals of the set of peripherals of the vehicle. The method also includes storing the set of resource requests, and receiving a resource configuration profile. A setpoint operating state is determined for each peripheral of the set of peripherals of the vehicle depending on the received set of resource requests and the received resource configuration profile. The method further includes controlling the set of peripherals depending on the specified setpoint operating state, such that an actual operating state of a respective peripheral of the set of peripherals corresponds to the specified setpoint operating state of the respective peripheral of the set of peripherals.

20 Claims, 2 Drawing Sheets

(56) References Cited

FOREIGN PATENT DOCUMENTS

DE   102011014681 A1   3/2012
KR      100648255 B1   11/2006

OTHER PUBLICATIONS

Written Opinion corresponding to International Patent Application No. PCT/EP2021/076695, dated Jan. 28, 2022 (7 pages).
German Search Report corresponding to German Patent Application No. 10 2021 103 569.4, dated Oct. 22, 2021. (6 pages).

* cited by examiner

METHOD FOR OPERATING A MULTIPLICITY OF PERIPHERALS OF A VEHICLE, COMPUTER-READABLE MEDIUM, SYSTEM, AND VEHICLE

The present application is the U.S. national phase of PCT Application PCT/EP2021/076695 filed on Sep. 28, 2021, which claims priority of German patent application No. 10 2021 103 569.4 filed on Feb. 16, 2021, which is incorporated herein by reference in its entirety.

TECHNICAL FIELD

The disclosure relates generally to operating a set or multiplicity of peripherals, in particular a set or multiplicity of integrated circuits of the peripherals, of a vehicle.

BACKGROUND

The energy efficiency of control units of a vehicles can reduce a $CO_2$ footprint of a vehicle with an internal combustion engine or extend the range of battery electric vehicles. From the prior art, it is known to reduce the CPU performance of a control unit in vehicles in order to reduce the energy consumption of the control unit. A control unit of a vehicle may comprise one or more peripherals. The peripherals of the control unit of the vehicle, and in particular the integrated circuits of the peripherals of the control unit of a vehicle, can only be switched off statically in vehicles so far in order to reduce the power consumption of the peripherals and thus also the power consumption of the control unit.

It is therefore an objective to operate one or more peripherals of a control unit of a vehicle more efficiently. In particular, it is an objective to operate integrated circuits of the peripherals of a control unit of the vehicle more efficiently, in particular more energy-efficiently.

SUMMARY

The above-described objective, as well as others, are achieved by the features of the embodiments and developments described herein.

A first aspect is characterized by a method for operating a set of peripherals, and in particular, a set of integrated circuits of the peripherals, of a vehicle. The method may be a computer-implemented method and/or a control unit-implemented method. The set of peripherals may include 1, 2, 3, 4, 5, or more peripherals. Preferably, the set of peripherals includes at least two peripherals. Each peripheral can contain one or more integrated circuits that are integrated into a control unit of the vehicle. The control unit of the vehicle may further include a processor that can control the integrated circuits of the peripherals of the control unit. Preferably, the peripherals of the set of peripherals are integrated in one or more control units of the vehicle. The vehicle can be a motor vehicle. The vehicle can be a partially, highly and/or fully automated vehicle. The vehicle can be a battery-electric vehicle, a plug-in hybrid electric vehicle, a hydrogen-powered vehicle, or a vehicle powered by an internal combustion engine.

The method in some embodiments involves receiving a set of resource requests from one or more applications of the vehicle, wherein a resource request of the set of resource requests one or more resources of one or more peripherals of the set of peripherals of the vehicle. The one or more applications of the vehicle are preferably applications that are executed in parallel on one or more of the control units of the vehicle. For example, a resource of a peripheral can be a function of a peripheral provided by an integrated circuit of the peripheral. The method also includes storing the set of resource requests. Preferably, the set of resource requests is stored in a database and/or in a volatile or non-volatile cache.

The method in some embodiments also includes receiving a resource configuration profile. The resource configuration profile can contain one or more rules for each resource that set resource-specific thresholds that cannot be exceeded or not reached. The method includes determining a setpoint operating state for each peripheral of the set of peripherals of the vehicle depending on the received set of resource requests and the received resource configuration profile. The setpoint operating state can determine whether a peripheral is required and therefore cannot be switched off, or whether the peripheral is not required and can therefore be switched off. Finally, the method includes controlling the set of peripherals depending on the determined setpoint operating state, so that an actual operating state of a respective peripheral of the set of peripherals corresponds to the determined setpoint operating state of the respective peripherals of the set of peripherals. Preferably, controlling the set of peripherals involves turning off or turning on an integrated circuit of a peripheral depending on the setpoint operating state and/or the actual operating state of the respective peripheral.

Advantageously, by determining a setpoint operating state for the set of resource requests of multiple applications of a vehicle, an energy-efficient operating state can be determined for the set of peripherals of a control unit of the vehicle. The control unit and thus the vehicle can be operated in a more energy-efficient manner. This can lead to a reduction in the $CO_2$ footprint of a vehicle with an internal combustion engine or an increase in the range of a battery-electric vehicle.

According to one embodiment, the peripherals may be peripherals of a control unit or an infotainment system of the vehicle. Furthermore, the peripherals can be peripherals of other control units of the vehicle, such as control units for controlling the traction drive, the driver assistance systems, and/or the vehicle access.

According to a further advantageous embodiment, a resource request of the set of resource requests may contain a timestamp and/or a resource request of the set of resource requests may contain a type of the resource request.

According to yet a further advantageous embodiment, the method may include the processing of the stored set of resource requests with respect to the respective resource of the peripherals and with respect to one or more predetermined time intervals, the removal of the stored set of resource requests after the processing of the stored set of resource requests, and a determination of the setpoint operating state for each peripheral of the set of peripherals of the vehicle depending on the processed set of resource requests and the received resource configuration profile. This allows the setpoint operating state for each peripheral to be determined more efficiently.

According to still another advantageous embodiment, the processing of the stored set of resource requests with respect to the respective resource of the peripherals and with respect to one or more predetermined time intervals may include an aggregation of the stored set of resource requests, and/or the processing of the stored set of resource requests with respect to the respective resource of the peripherals and with respect to one or more predetermined time intervals may include transforming the stored set of resource requests. This allows the stored set of resource requests to be processed flexibly in order to simplify the determination of the setpoint operating state.

According to yet another advantageous embodiment, the determination of the setpoint operating state for each peripheral of the set of peripherals of the vehicle depending on the received and/or processed set of resource requests and the received resource configuration profile may include training classifiers using the received and/or processed set of resource requests, classifying the resources of the peripherals based on the classifiers, filtering the classified resources of the peripherals using one or more filter rules of the received resource configuration profile, and determining the setpoint operating state for the classified resources of the peripherals depending on the received resource configuration profile. This allows the setpoint operating state of the peripherals to be determined efficiently and dynamically.

According to yet a further advantageous embodiment, the determination of the setpoint operating state for each peripheral of the set of peripherals of the vehicle depending on the received and/or processed set of resource requests and the received resource configuration profile may further require receiving an incorrect actual operating state of one or more peripherals of the set of peripherals and a resource request that cannot be implemented. The classifiers can be trained using the resource request that cannot be implemented. This can be used to efficiently improve the determination of the setpoint operating state, so that incorrect actual operating states of the peripherals are avoided when adapting the actual operating states to the setpoint operating states.

A further aspect is characterized by a computer-readable medium for operating peripherals of a vehicle, wherein the computer-readable medium contains instructions which carry out the method described above when executed on a control unit or a computer.

A further aspect is characterized by a system for operating peripherals of a vehicle, wherein the system is set up to carry out the method described above.

A further aspect is characterized by a vehicle containing the system described above for operating peripherals of the vehicle.

Further features result from the claims, the figures and the description of the figures. All features and feature combinations mentioned above in the description as well as the features and feature combinations mentioned below in the description of the figures and/or shown in the figures alone can be used not only in the respective specified combination, but also in other combinations or on their own.

An exemplary embodiment is described below on the basis of the attached drawings. This results in further details, preferred embodiments and developments.

DETAILED DESCRIPTION

Figure 1:
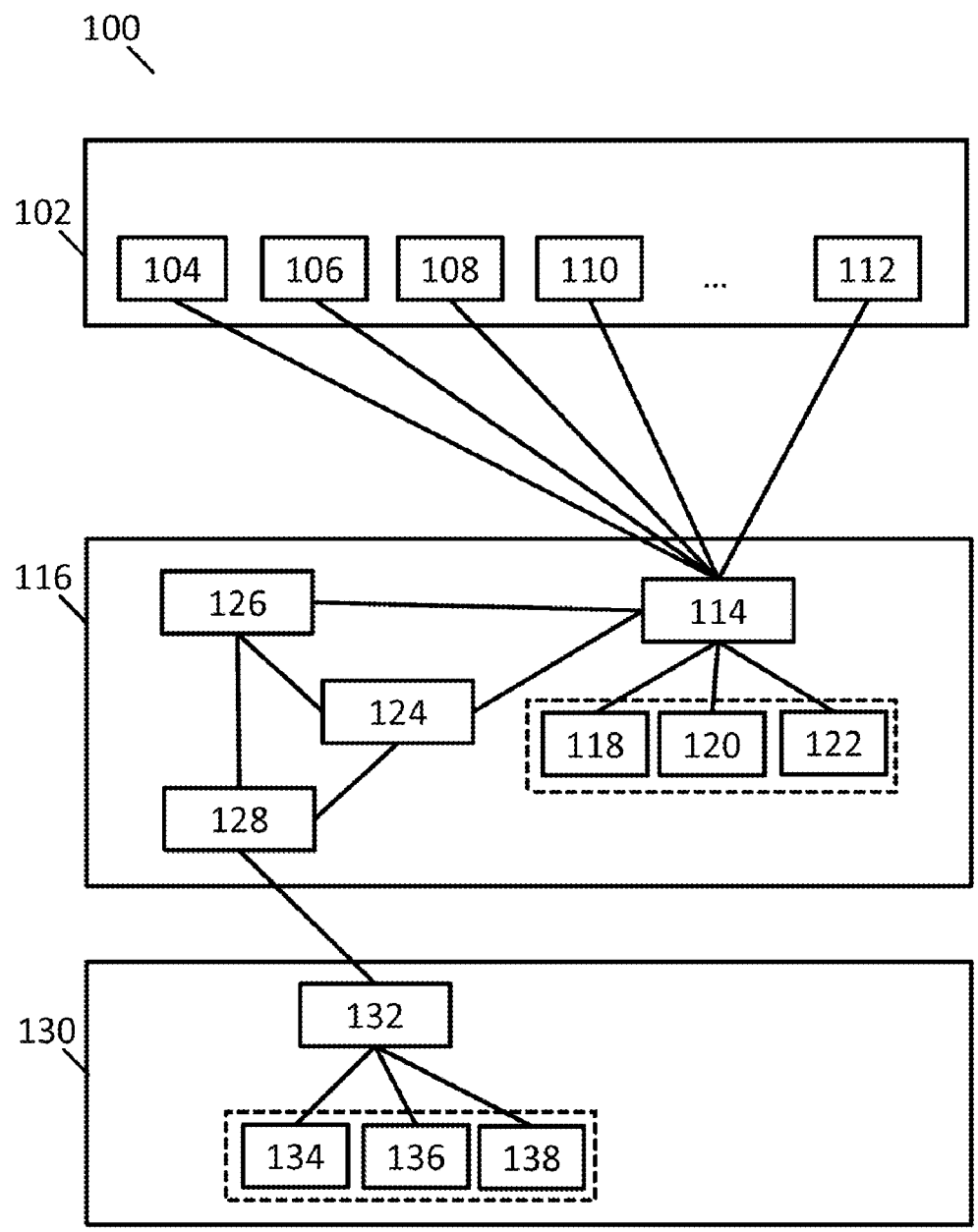
FIG. 1 shows an exemplary system for operating peripherals of a vehicle schematically in detail.

In detail, FIG. 1 shows a system 100 for operating peripherals of a vehicle, in particular for operating integrated circuits of the peripherals of the vehicle.

The system 100 can be, for example, a control unit or an infotainment system of a vehicle. Furthermore, the system 100 may be a control unit for controlling the traction drive, the driver assistance systems, and/or the vehicle access.

Figure 2:
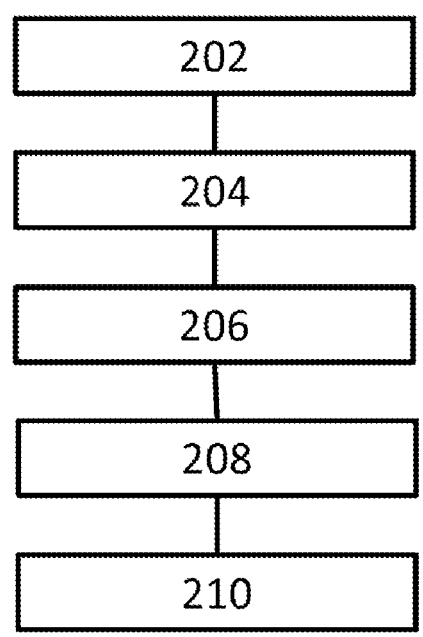
FIG. 2 shows an exemplary method for operating peripherals of a vehicle schematically in detail.

In the case of a control unit or an infotainment system of a vehicle with multiple peripherals, it is often not possible to put the integrated circuits of the peripherals into an energy-saving operating state. For example, an energy-saving operating state can be achieved when the integrated circuit of a peripheral is switched off, for example by switching off or interrupting a power supply to the integrated circuit. The system 100 may carry out the method 200 to operate the peripherals as shown in FIG. 2.

In general, the system 100 can continuously determine a setpoint operating state for all peripherals of the system 100. The setpoint operating state determines which integrated circuits of the peripherals are required with regard to a current application context. The current application context includes all applications that are currently running on the system.

The integrated circuits of the peripherals may include integrated circuits for wireless or wired communication interfaces, such as Bluetooth, WiFi, and/or USB, displays, cameras, positioning systems, satellite-based navigation systems, audio systems, and/or video systems. The integrated circuits of the peripherals can be integrated with a computing unit, such as a processor or a system-on-a-chip, on one or more boards of a control unit. Each integrated circuit of a peripheral can be dynamically set into an energy-saving operating state. The energy-saving operating state can be achieved, for example, by resetting the integrated circuit by means of a reset pin of the integrated circuit or by switching off a power supply for the integrated circuit. Switching off the power supply can be done, for example, by a load divider, for example by a switch for a power supply of the integrated circuit that controls the power supply of a single integrated circuit, or by turning off a power rail to which multiple integrated circuits are connected.

The system 100 can run multiple applications 104, 106, 108, 110, 112 at the application level 102. Preferably, the system 100 can run multiple applications simultaneously. The application can be background applications and applications with a graphical user interface. The applications can be native applications or applications that run in a runtime environment. Each application can generate one or more resource requests directly or indirectly. A resource request may require resources from one or more integrated circuits of one or more peripherals. For example, a resource request may include communication by means of a Bluetooth chip as a first peripheral, and another resource request may include an audio output by means of the audio chip as a second peripheral.

The system 100 may contain a resource request collection unit 114. Preferably, the resource request collection unit 114 is a part of the operating system 116 of the system 100. The resource request collection unit 114 may receive a set of resource requests from one or more applications 202. As described above, a resource request of the set of resource requests can request resources of one or more peripherals of the set of peripherals. Preferably, the resource request collection unit 114 can receive all resource requests from any application running at the application level 102. As the resource request collection unit 114 stores all resource requests of all applications of the system 100 in the database, the resource request collection unit 114 has a complete overview of the required resources of all resource requests.

The resource request collection unit 114 may forward the resource requests of the applications to the driver software of the peripheral. Alternatively, the resource request collection unit 114 may obtain a copy of the resource requests of the applications from the peripheral driver software or another component of the operating system 116. In addition, the resource request collection unit 114 may receive and store a message from the driver software of the peripheral about an error of a resource of an integrated circuit of the peripheral. For example, the driver software may report a hardware defect to the resource request collection unit 114, which can be added as additional information to a resource request and stored in the database of the resource request collection unit 114.

The resource request collection unit 114 can store 204 the set of received resource requests. The resource request collection unit 114 can store the received resource requests in a database. A resource request can include a timestamp or a type. If the resource request does not include a timestamp, the resource request collection unit 114 can add a timestamp to the resource request so that each resource request includes a timestamp. The type of the resource request can be a read request, a write request, a configuration request, or a status request for a peripheral.

In addition, the resource request collection unit 114 can process the stored set of resource requests. The resource request collection unit 114 can determine a frequency of resource requests of the same type. The resource request collection unit 114 can store the determined frequency of resource requests in the database together with the resource requests.

The resource request collection unit 114 may aggregate all requests to a particular resource of a peripheral for one or more predetermined time intervals. Table 1 below shows an example of transforming the timestamps of the resource requests into resource requests per time interval for three predetermined time intervals:

TABLE 1

Frequency of resource requests for predetermined time intervals

| | Resource requests in the last 10 ms Interval | Resource requests in the last 1 s Interval | Resource requests in the last 10 s Interval |
|---|---|---|---|
| USB | 1000 | 1000 | 1000 |
| Bluetooth/WiFi | 10 | 10000 | 10000 |
| Navigation | 0 | 0 | 0 |
| Image processing | 0 | 0 | 5 |
| Serializer/Deserializer | 1 | 100 | 1000 |

The frequency of the resource requests for different predetermined time intervals from Table 1 gives an overview of the timing of the use of the integrated circuits of the peripherals by the applications. Table 1 shows that the integrated circuit of the navigation system was not used in the last 10s interval. Consequently, the integrated circuit of the navigation system can be switched off in order to Saving energy. The integrated circuit for USB, on the other hand, was used in the last 10 ms interval alone by 1000 resource requests. This behavior may indicate a start of a new application that uses a USB interface, or an already running application that performs a function for which the USB interface is required since the last 10 ms interval. The integrated circuit for Bluetooth/WiFi has been used in the last 1 s-interval. The integrated circuit for Bluetooth/WiFi was not used in the 9 s before, as the integrated circuit was not required. The integrated circuit for Bluetooth/WiFi could therefore have been switched off in this time interval. The serializer/deserializer integrated circuit was continuously used by the applications of the control unit over the last 10 s. It is not possible to save energy with this integrated circuit. The integrated circuit for image processing was used in the last 10 s interval, but only at the beginning of the last 10 s interval, but not in the last second of the 10 s interval. The integrated circuit for image processing is no longer required by the applications and can therefore be switched to an energy-saving operating mode.

Transforming the timestamps of the resource requests into requests per time interval for different time intervals can be used to determine features for a resource decision unit 124, which may, for example, use a machine learning technique of the resource decision unit 124. Furthermore, by transforming the timestamps of resource requests into requests per time interval the number of resource requests stored in the database of the resource request collection unit 114 can be reduced. The resource requests, the timestamps of which have been processed by the resource request collection unit, can be removed from the database.

The resource request collection unit 114 may transmit the resource requests, the timestamps, the frequency of the resource requests to the resource decision unit 124, and/or any other data stored in the database continuously to the resource decision unit 124.

The resource decision unit 124 may receive the resource requests, the timestamps, the frequency of the resource requests, and any other items stored in the database of the resource request collection unit 114 from the resource request collection unit 114. Furthermore, the resource decision unit 124 may receive 206 a resource configuration profile from a process control unit 126.

The resource decision unit 124 can determine from the received data which resources of the peripherals are currently required. In particular, the resource decision unit 124 can determine which integrated circuits of the peripherals are currently required and which are not required. For this purpose, the resource decision unit 124 may determine 208 a setpoint operating state for each integrated circuit of the peripherals depending on the received set of resource requests and the received resource configuration profile. The setpoint operating state determines for each integrated circuit of the peripherals whether the integrated circuit can be set to an energy-saving operating state or whether it must continue to operate.

The resource decision unit 124 can determine the decision about the setpoint operating state of each integrated circuit based on rules. In addition or alternatively, the resource decision unit 124 may determine the decision on the setpoint operating state by means of a machine learning method, such as a neural network. The training of the neural network can be carried out on a server external to the vehicle.

The resource decision unit 124 may determine the setpoint operating state as a multiclass classification problem for all integrated circuits of the peripherals or as a binary classification problem for each individual integrated circuit. The feature vector for the multiclass classification problem can be generated using the resource configuration profile and/or the collected and/or transformed resource requests. The resource configuration profile can include features that are added to the feature vector. For example, the resource configuration profile can set a maximum start time and/or a maximum latency for each integrated circuit. The maximum start time and/or the maximum latency can be added as features to the feature vector. Furthermore, combinations of peripherals that occur in certain application scenarios and form a class of the multiclass classification problem can be defined for the multiclass classification problem.

The resource decision unit 124 may alternatively determine the setpoint operating state for each individual integrated circuit of the peripherals as a binary classification problem. The result of the binary classification is that the corresponding integrated circuit should either be turned on or off.

Both classification problems, the multiclass classification problem and the binary classification problem, can be solved by known linear and/or non-linear classification algorithms. Examples of linear and non-linear classification algorithms are deep neural networks, decision trees, k-nearest neighbors, or support vector machines. The classification algorithm used by the resource decision unit can depend on the number of classes, the available computing power of the control unit, and the complexity of the scenario, such as the number of applications running at the same time and/or what resources those applications require. Preferably, the classification algorithm of the resource decision unit 124 can be determined by the received configuration profile.

Furthermore, the resource decision unit 124 may contain a state machine. The state machine may delay transmission of the setpoint operating states to a resource provision unit 128. In detail, the state machine can apply a filter to the setpoint operating states of the peripherals. The filter can be a low-band filter or a hysteresis curve. By applying the filter to the setpoint operating states, rapid, short-term changes in the operating modes of the integrated circuits can be eliminated. Frequent switching off and on of the integrated circuits of the peripherals can be avoided during periods of time when no energy savings or only an energy saving of less than a specified minimum threshold can be achieved by switching off one or more integrated circuits, and/or a latency greater than a specified maximum threshold is caused by switching on one or more integrated circuits.

Preferably, the resource decision unit 124 uses a neural network for determining the setpoint operating states. The training of the neural network can be monitored on a server external to the vehicle. The data for training the neural network can be generated by running individual applications and/or combinations of applications on a control unit, the resource requests are collected by the resource request collection unit 114 and the collected resource requests with the corresponding class of required and not required resources are provided with a marker. Furthermore, the neural network can be trained with resource requests of incorrect setpoint operating states. For this purpose, the resource requests and the incorrect setpoint operating states can be transmitted from the vehicle to the server external to the vehicle. After learning the resource requests from faulty setpoint operating states, the server external to the vehicle can transmit adjusted weights for the neural network to the vehicle, in particular to the process control unit 126. The process control unit 126 may transmit the adjusted weights of the neural network as parameters of the resource configuration profile to the resource decision unit 124.

The resource decision unit 124 can communicate the setpoint operating states to the resource provision unit 128. The resource provision unit 128 can receive the setpoint operating states from the resource decision unit 124. Furthermore, the resource provision unit 128 can control the set of peripherals depending on the determined setpoint operating state 210 in such a way that an actual operating state of a respective peripheral of the set of peripherals corresponds to the particular setpoint operating state of the respective peripheral of the set of peripherals. In detail, the resource provision unit 128 controls the integrated circuits by means of a processor 132 that performs the switching off and on of the integrated circuits of the peripherals 134, 136, 138 at the hardware level 130 of the system. The switching on and off of the integrated circuits of the peripherals can be carried out by switching on or off the power rails, special power distribution circuits, and/or putting the integrated circuit into a reset state with a low power consumption.

The process control unit 126 can monitor and control the resource request collection unit 114, the resource decision unit 124, and the resource provision unit 128. For example, the process control unit 126 can overrule a decision about a setpoint operating state of the resource decision unit 124 and can deactivate the resource decision unit 124, the resource request collection unit 114 and/or the resource provision unit 128 so that no setpoint operating states are determined and implemented.

For example, the process control unit may specify that a resource must never be turned off and/or put into an energy-saving operating state, even if the integrated circuit of the peripheral is not required. If a start time of an integrated circuit of a peripheral and/or an unavailability of the integrated circuit of a peripheral cannot be tolerated at any time, the process control unit may add a rule for that resource in the resource configuration profile which the resource decision unit 124 must always consider.

Advantageously, the system 100 and the method 200 can dynamically shut down peripherals of a control unit of the vehicle when a set of applications do not require one or more peripherals. The control unit and the peripheral of the control unit can be operated in a more energy-efficient manner.

REFERENCE SIGN LIST

100 System
102 Application level
104 Application
106 Application
108 Application
110 Application
112 Application
114 Resource request collection unit
116 Operating system
118 Driver software
120 Driver software
122 Driver software
124 Resource decision unit
126 Process control unit
128 Resource provision unit
130 Hardware level
132 Processor
134 Integrated circuit of a peripheral
136 Integrated circuit of a peripheral
138 Integrated circuit of a peripheral
200 Method
202 Receiving a set of resource requests
204 Storing the set of resource requests
206 Receiving a resource configuration profile
208 Determining a setpoint operating state
210 Control a set of peripherals

The invention claimed is:

1. A method for operating a set of integrated circuits of a set of peripherals of a vehicle, the method comprising:
receiving a set of resource requests from one or more applications of the vehicle, wherein a resource request of the set of resource requests at least one resource from one or more peripherals of the set of peripherals of the vehicle;

storing the set of resource requests;
receiving a resource configuration profile;
determining a setpoint operating state for each peripheral of the set of peripherals of the vehicle depending on the received set of resource requests and the received resource configuration profile; and
controlling the set of peripherals depending on the specified setpoint operating state, such that an actual operating state of a respective peripheral of the set of peripherals corresponds to the specified setpoint operating state of the respective peripheral of the set of peripherals.

2. The method as claimed in claim 1, wherein the set of peripherals comprises peripherals of a control unit or an infotainment system of the vehicle.

3. The method as claimed in claim 1, wherein the resource request of the set of resource requests contains a timestamp.

4. The method as claimed in claim 3, wherein the resource request of the set of resource requests contains a type of the resource request.

5. The method as claimed in claim 1, wherein the resource request of the set of resource requests a type of the resource request.

6. The method as claimed in claim 1, further comprising:
processing the stored set of resource requests with respect to a respective resource of the set of peripherals and with respect to one or more predetermined time intervals;
removing the stored set of resource requests after processing the stored set of resource requests; and
determining the setpoint operating state for each peripheral of the set of peripherals of the vehicle depending on the processed set of resource requests and the received resource configuration profile.

7. The method as claimed in claim 6, wherein the processing of the stored set of resource requests with respect to the respective resource of the set of peripherals and with respect to the one or more predetermined time intervals includes an aggregation of the stored set of resource requests.

8. The method as claimed in claim 6, wherein the processing of the stored set of resource requests with respect to the respective resource of the set of peripherals and with respect to the one or more predetermined time intervals includes transforming the stored set of resource requests.

9. The method as claimed in claim 6, wherein the determination of the setpoint operating state for each peripheral of the set of peripherals of the vehicle depending on the received set of resource requests and the received resource configuration profile includes:
training classifiers using the processed set of resource requests and/or the received set of resource requests;
classifying the resources of the peripherals based on the classifiers;
filtering the classified resources of the peripherals using one or more filter rules of the received resource configuration profile; and
determining the setpoint operating state for the classified resources of the peripherals depending on the received resource configuration profile.

10. The method as claimed in claim 6, wherein the determination of the setpoint operating state for each peripheral of the set of peripherals of the vehicle depending on the received set of resource requests and the received resource configuration profile includes:
training classifiers using the processed set of resource requests;
classifying the resources of the peripherals based on the classifiers;
filtering the classified resources of the peripherals using one or more filter rules of the received resource configuration profile; and
determining the setpoint operating state for the classified resources of the peripherals depending on the received resource configuration profile.

11. The method as claimed in claim 10, wherein the determination of the setpoint operating state for each peripheral of the set of peripherals of the vehicle depending on the received set of resource requests and the received resource configuration profile further includes:
receiving an incorrect actual operating state of one or more peripherals of the set of peripherals and a resource request that cannot be implemented; and
wherein the classifiers are trained using the resource request that cannot be implemented.

12. The method as claimed in claim 6, wherein the determination of the setpoint operating state for each peripheral of the set of peripherals of the vehicle depending on the received set of resource requests and the received resource configuration profile further includes:
receiving an incorrect actual operating state of one or more peripherals of the set of peripherals and a resource request that cannot be implemented; and
wherein the classifiers are trained using the resource request that cannot be implemented.

13. The method as claimed in claim 1, wherein the determination of the setpoint operating state for each peripheral of the set of peripherals of the vehicle depending on the received set of resource requests and the received resource configuration profile includes:
training classifiers using the received set of resource requests;
classifying the resources of the peripherals based on the classifiers;
filtering the classified resources of the peripherals using one or more filter rules of the received resource configuration profile; and
determining the setpoint operating state for the classified resources of the peripherals depending on the received resource configuration profile.

14. The method as claimed in claim 13, wherein the determination of the setpoint operating state for each peripheral of the set of peripherals of the vehicle depending on the received set of resource requests and the received resource configuration profile further includes:
receiving an incorrect actual operating state of one or more peripherals of the set of peripherals and a resource request that cannot be implemented; and
wherein the classifiers are trained using the resource request that cannot be implemented.

15. The method as claimed in claim 1, wherein the determination of the setpoint operating state for each peripheral of the set of peripherals of the vehicle depending on the received set of resource requests and the received resource configuration profile further includes:
receiving an incorrect actual operating state of one or more peripherals of the set of peripherals and a resource request that cannot be implemented; and
wherein the classifiers are trained using the resource request that cannot be implemented.

16. A non-transitory computer-readable medium for operating peripherals of a vehicle, wherein the computer-readable medium contains instructions which, when executed on a control unit or a computer, carry out the method as claimed in claim 1.

17. A system for operating peripherals of a vehicle, wherein the system is configured to carry out the method as claimed in claim 1.

18. A vehicle containing the system for operating peripherals of the vehicle as claimed in claim 17.

19. The method as claimed in claim 1, wherein determining the setpoint operating state for each peripheral further comprises employing a neural network to determine setpoint operating states for each peripheral of the set of peripherals of the vehicle depending on the received set of resource requests and the received resource configuration profile.

20. The method of as claimed in claim 19, wherein the resource configuration file includes parameters of the neural network.

\* \* \* \* \*